(12) United States Patent
Verlaan

(10) Patent No.: US 11,470,421 B1
(45) Date of Patent: Oct. 11, 2022

(54) CONTROL USAGE OF ELECTRONIC DEVICES IN PREMISES

(71) Applicant: JT INTERNATIONAL SA, Geneva (CH)

(72) Inventor: Theo Verlaan, Geneva (CH)

(73) Assignee: JT INTERNATIONAL SA, Geneva (CH)

( * ) Notice: Subject to any disclaimer, the term of this patent is extended or adjusted under 35 U.S.C. 154(b) by 0 days.

(21) Appl. No.: 17/590,123

(22) Filed: Feb. 1, 2022

(51) Int. Cl.
*H04R 3/12* (2006.01)
*H04R 5/02* (2006.01)

(52) U.S. Cl.
CPC ............... *H04R 3/12* (2013.01); *H04R 5/02* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 10,976,432 B2* | 4/2021 | Schediwy | G01S 15/89 |
| 11,106,773 B2* | 8/2021 | Popplewell | A24F 40/53 |
| 2004/0128560 A1* | 7/2004 | Challener | G06F 21/34 |
| | | | 713/2 |
| 2021/0350374 A1* | 11/2021 | Keen | G06Q 50/265 |
| 2021/0382974 A1* | 12/2021 | Popplewell | A61M 15/06 |
| 2021/0385579 A1* | 12/2021 | Nesfield | H04N 21/4223 |
| 2021/0401061 A1* | 12/2021 | Davis | A24F 40/42 |

\* cited by examiner

*Primary Examiner* — Paul W Huber
(74) *Attorney, Agent, or Firm* — Chip Law Group

(57) ABSTRACT

Provided is a system that controls at least one sound signal output device to emit at least one sound signal in at least one chosen area of a premises. This sound signal represents location-specific usage information of at least one electronic device and is intended to induce a control of a usage of this electronic device based on this location-specific usage information.

17 Claims, 2 Drawing Sheets

CONTROL USAGE OF ELECTRONIC DEVICES IN PREMISES

FIELD

The present disclosure relates generally to remote control of usage of electronic devices.

BACKGROUND

In many premises usage of some electronic devices is forbidden or restricted in one or more areas, possibly depending on a time interval of day. This is notably the case of vaping devices, such as "E-vapor devices" or "T-vapor (or heat-not-burn) devices", and it would be also beneficial to introduce a usage limitation of some other electronic devices in some areas of premises to avoid disturbing people. This is notably the case of smartphones whose call tones and conversation mode should not be authorized in some specific areas, but also of game console, for instance.

Currently, limitations on the physical locations where usage of these electronic devices is allowed are done by way of physical signages. For instance, it may be mentioned "vaping allowed" in smoking corners or rooms. But, this appears sometimes to be not very clear, and the physical signage needs to be large and intrusive to be effective, which might not be possible or desirable.

It has been proposed in the patent document US 2021/0350374 A1 to check the age and/or identity of an electronic device user in a premises or in the vicinity of a premises, and to allow usage of this electronic device by its user by means of a remote control only when the user's age is over a threshold and/or when the user's identity allows such a usage.

However, such a solution does not allow control of usage of an electronic device depending on its location in a premises (including its approach), while the number of public or private premises in which usage of electronic devices is locally restricted or forbidden keeps increasing.

Accordingly, it would be beneficial to improve the situation to reduce the number of electronic devices that are used in forbidden or restricted areas of premises by an intrusive action.

SUMMARY

A system, an electronic equipment, an electronic device and method for controlling location-specific usage are provided substantially as shown in, and/or described in connection with, at least one of the figures, as set forth more completely in the claims.

The features, functions and advantages that have been discussed above and are described below in details can be achieved independently in various examples or may be combined in other examples. Further details of the examples can be seen with references to the following description and drawings.

BRIEF DESCRIPTION OF THE FIGURES

The novel features believed characteristics of the illustrative examples are set forth in the appended claims. The illustrative examples, however, as well as preferred modes of use, further objectives and descriptions thereof, will be better understood upon reading the following detailed description, which is given solely by way of non-limiting examples and which is made with reference to the appended drawings, wherein:

DETAILED DESCRIPTION

Figure 1:
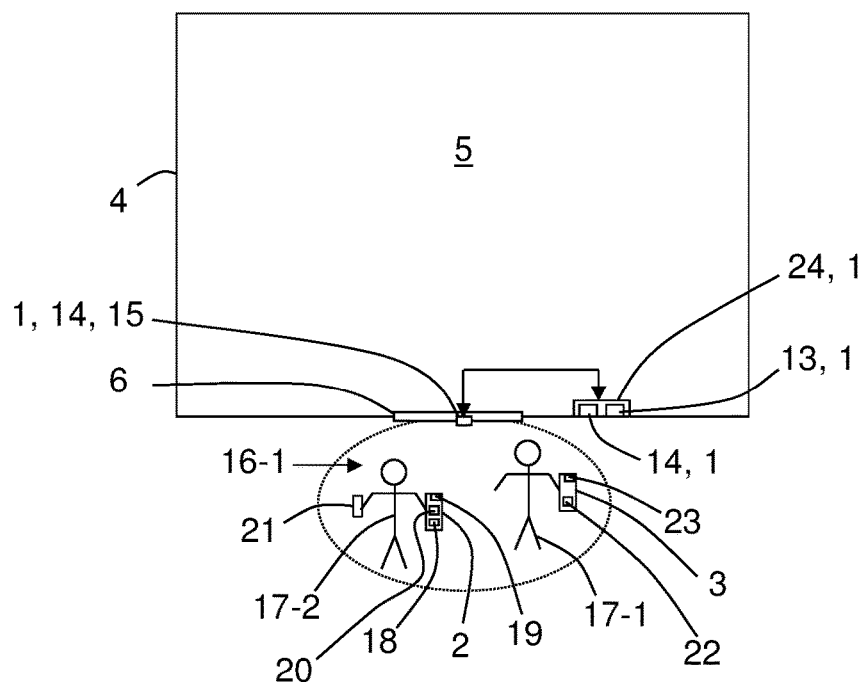
FIG. 1 schematically and functionally illustrates a first example of premises comprising a first example of a system according to an embodiment of the invention that defines a single outside area in the approach of its main door where users of specific electronic devices and/or electronic equipments may receive sound signals representing location-specific usage information, FIG. 2 schematically and functionally illustrates a second example of premises comprising a second example of a system according to an embodiment of the invention that defines several inside areas where users of specific electronic devices and/or electronic equipments may receive different sound signals representing different location-specific usage information, FIG. 3 schematically illustrates a first example of algorithm implementing a method according to an embodiment of the invention and implemented by a system according to an embodiment of the invention, FIG. 4 schematically illustrates a second example of algorithm that may be implemented by an electronic equipment according to an embodiment of the invention, and FIG. 5 schematically illustrates a third example of algorithm that may be implemented by an electronic device according to an embodiment of the invention.

The present description is directed notably to a system 1, an electronic equipment 2, an electronic device 3 and a method for controlling location-specific usage of electronic devices 3, 21 in premises 4 (including their approaches).

In the following description it will be considered that the electronic devices 3, 21 are vaping devices, such as E-vapor devices or T-vapor (or heat-not-burn) devices producing an aerosol by heating an aerosol-forming substance mixed with air during a vaping session of their user. But an electronic device 3, 21 could be of another type, as soon as it may be used by a user. So, for instance, the electronic device 3, 21 could be an aerosol generation device, an electronic cigarette, or a tobacco and/or nicotine delivery device.

Each electronic device 3, 21 is carried by a user 17-k which also possibly comprises an electronic equipment 2. In the following description the letter k associated to the reference numeral 17 is used to designate different users of electronic devices 3, 21 and also possibly of electronic equipments 2. In the following description two types of electronic device will be mentioned: a first type associated with the reference numeral 3 and comprising electronic devices with a "third" circuitry 22 and a microphone 23 and being an embodiment of the invention, and a second type associated with the reference numeral 21 and comprising electronic devices that do not comprise a third circuitry 22 associated to a microphone 23.

Figure 2:
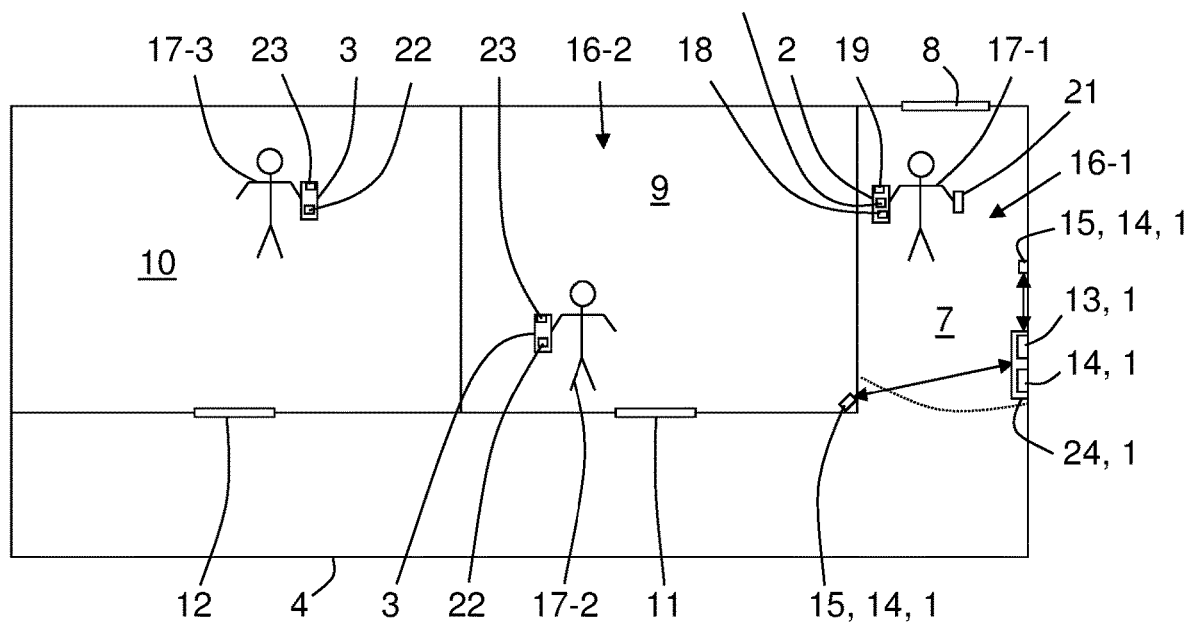

Two examples of premises 4 comprising a system 1 according to the invention are schematically and respectively illustrated in FIGS. 1 and 2. In the first example illustrated in FIG. 1 the premises 4 comprises only one room 5 into which persons may access via a main door 6. Such a premises 4 may be a shop or a restaurant, for instance. In the second example illustrated in FIG. 2 the premises 4 comprises a hall 7 into which persons may access via a main door 8 and allowing access to first 9 and second 10 rooms (respectively via doors 11 and 12). Such a premises may be a building, for instance.

As illustrated in FIGS. 1 and 2, a system 1 according to the invention comprises at least a first circuitry 13 and possibly a sound signal output device 14 comprising at least one loudspeaker 15. It is important to note that the sound signal output device 14 may be part of the system 1 as illustrated, but this not mandatory (indeed, it may be an equipment of a premises 4 (such as a public address (or PA) system or a background music system, for instance)).

The use of loudspeakers 15 is advantageous because they are readily available and easy to install, and still more advantageous when they are already equipping rooms and/or zones of a premises 4 and therefore may be used without additional cost.

As illustrated in the non-limiting examples of FIGS. 1 and 2, the first circuitry 13 and at least a part of the sound signal output device 14 may be comprised into a box 24 of the system 1.

The first circuitry 13 of system 1 comprises at least a processor and a memory arranged for performing operations. For instance, the (each) processor may be a digital signal processor (or DSP), or an application specific integrated circuit (ASIC), or else a field programmable gate array (FPGA). More generally, the processor may comprise integrated (or printed) circuits, or several integrated (or printed) circuits connected therebetween through wired or wireless connections. The term "integrated (or printed) circuits" refers here to any type of device capable of carrying out at least one electric or electronic operation. Also, for instance, the memory may be a random access memory (or RAM). But it may be any type of device arranged for storing program instructions for the associated processor.

Generally speaking, the functions of the first circuitry 13 may be carried out through the operation of program logic, through dedicated logic, through the interaction of program control and dedicated logic, or even partially manually (by a user). These functions may be provided through the use of dedicated hardware as well as hardware capable of executing software in association with appropriate software.

The first circuitry 13 may also comprise, in addition with its processor(s) and memory(ies), an input interface, a mass memory (notably for storing intermediate data produced during its calculus and processing), and an output interface for delivering messages and instructions.

Figure 3:
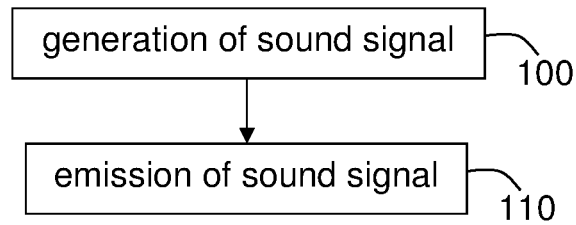

As illustrated in FIG. 3, the first circuitry 13 is configured to carry out at least one operation 100-110 consisting in controlling at least one sound signal output device 13, equipping at least partly a premises 4, to emit at least one sound signal in at least one chosen area 16-j of this premises 4. In the following description the letter j associated to the reference numeral 16 is used to designate different areas of a premises 4 where sound signals are emitted by at least one loudspeaker 15.

Each emitted sound signal represents location-specific usage information of at least one electronic device 3, 21 and induces, directly or indirectly, control of usage of an electronic device 3, 21 (temporarily located in the premises area 16-j where this sound signal has been emitted) based on this location-specific usage information.

Thanks to this specific sound signal emission, it is now possible to induce a specific usage of an electronic device 3, 21 depending on the current location or next location of its user 17-k. It is important to note that the specific usage may be automatically controlled or may result from the behaviour of the user 17-k that has been informed by his electronic device 3, 21.

For instance, in an embodiment the usage control may:
allow (or enable) activation of the electronic device 3 (here to allow a vaping session),
disable activation of the electronic device 3 (here to forbid any vaping session),
control the strength of a material used in the electronic device 3,
control the time duration of usage of the electronic device 3,
output an optical signal indicating whether usage of the electronic device 3 is restricted or permitted or else forbidden, and
output an audio alert indicating whether usage of the electronic device 3 is restricted or permitted or else forbidden.

Also, for instance, in an embodiment a location-specific usage information may comprise:
a restriction information indicating whether usage of an electronic device 3, 21 is restricted or forbidden, and/or
a permission information indicating whether usage of the electronic device 3, 21 is permitted, and/or
an electronic device specific information that indicates whether usage of a specific type of electronic device 3, 21 is permitted, and/or
a location information that indicates at least one area 16-j of a premises 4 where usage of the electronic device 3, 21 is permitted or restricted or else forbidden.

When the electronic device 3, 21 is a vaping device, its specific type may refer to the fact that it is an E-vapor device or a T-vapor (or heat-not-burn) device, for instance. But in another example the specific type of an electronic device 3, 21 may be an aerosol generation device or an electronic cigarette or a tobacco and/or nicotine delivery device, for instance.

Also, for instance, in an embodiment a location-specific usage information may also comprise a first timing information that indicates a time interval of day during which usage of an electronic device 3, 21 is permitted and/or a second timing information that indicates a time interval of day during which usage of this electronic device 3, 21 is restricted or forbidden. This allows takes into account the case where a premises 4 has variable usage limitations depending on the time interval of day, this time interval being possibly variable from one area 16-j to another area 16-y.

For instance, different sound signals may be used depending on the day time for indicating different usages during a day. It is notably possible to allow a first type of vaping device during a part of the day and a second type of vaping device during another part of the day.

Also, for instance, in an embodiment the first circuitry 13 may be configured to control at least one parameter of the emitted sound signal to change the surface and/or location of a chosen area 16-j. In this case, each parameter may be chosen from a group comprising the intensity of the emitted sound signal, the directivity of the emitted sound signal, the frequency range of the emitted sound signal, and the sound signal source localization of the emitted sound signal (i.e. the location of the concerned loudspeaker 15). This allows adapting the detectable range and reception surface and location of each sound signal to the configuration of a premises room or a premises approach or a part of a premises zone, thanks to the fact that the intensity of a sound signal decays with distance from the source (i.e. the loudspeaker 15).

Also, for instance, in an embodiment the emitted sound signal may be:

an inaudible standalone sound signal representing the location-specific usage information (i.e. a non combined signal), or an audible sound signal representing the location-specific usage information, or else a mixed sound signal that includes a mix of an inaudible sound signal representing the location-specific usage information and an audible sound signal.

In the first alternative (inaudible standalone sound signal) the sound signal has an inaudible frequency, and therefore is not disturbing or distracting for users and the environment. The location-specific usage information may be encoded into a primary inaudible sound signal.

In the second or third alternative the audible sound may be a natural sound signal, a music or an audio advertisement, for instance.

In the third alternative the mixing may be an encoding performed by an audio mixer of the sound signal output device 14. In complex systems 1 the individual loudspeakers 15 may form groups (which preferably correspond to geographic locations with the facility (like building, stadium, shopping mall), generally called group busses. This makes it easy to distribute the appropriate location-specific usage information to the concerned locations. For instance, a large conference location can have the same background music broadcast everywhere, but with different policy information included in the audio stream going to specific locations (or loudspeaker(s) 15).

But in a variant of the third alternative the mixing may be a simple combination of the location-specific usage information (represented by the inaudible sound signal) with a primary audible sound signal.

As illustrated in FIG. 2, the system 1 may comprise the sound signal output device 14, which may comprise a group of loudspeakers 15 intended for being distributed across the premises 4 to establish a plurality of chosen areas 16-j at different locations within this premises 4. In this case, at least one of the chosen areas 16-j has a controllable virtual boundary for application of a corresponding location-specific usage information. A virtual boundary may be controlled by the intensity and/or by wall(s) delineating a room or a zone of a premises 4.

The walls of the premises 4 participate to creation of a geographical delimitation of the sound signal because they prevent the latter to pass through (so they induce a geofencing). Such a delimitation appears to be much more accurate than, for instance, using radio waves (possibly with the WiFi standard) that are not (or slightly) constrained by obstructions like walls.

In addition, loudspeaker systems are readily available and easily installed. Existing loudspeaker infrastructure can be used as well.

In the non-limiting example illustrated in FIG. 2, the sound signal output device 14 comprises two loudspeakers 15. A first loudspeaker 15 is installed in the hall 7 of the premises 4 (in the vicinity of the main door 8) where it defines a first area 16-1 (j=1), for instance to emit a sound signal indicating that vaping is only allowed in this hall 7. The first area 16-1 has a virtual boundary defined partly by walls and a surface equal to the surface of a part of the hall 7. A second loudspeaker 15 is installed in the first room 9 of the premises 4 where it defines a second area 16-2 (j=2), for instance to emit a sound signal indicating that vaping is forbidden in this first room 9. The second area 16-2 has a virtual boundary totally defined by the walls delineating the first room 9 and therefore a surface equal to the surface of the first room 9. The second room 10 does not comprise any loudspeaker 15, and therefore this may indicate that vaping is authorized inside or this may indicate in the absence of sound signal that vaping is forbidden (or authorized), by default.

So, in this second example, the plurality of chosen areas 16-j includes at least one first chosen area 16-1 of the premises 4 associated with a first type of location-specific usage information (here allowed vaping), and at least one second chosen area 16-2 of the premises 4 associated with a second type of location-specific usage information (here forbidden vaping).

But in another example the plurality of chosen areas 16-j could be associated with only one type of location-specific usage information (for instance allowed vaping or forbidden vaping).

In still another example, the sound signal output device 14 may define only one outside or inside area 16-1 with at least one loudspeaker 15. This is notably the case in the non-limiting example illustrated in FIG. 1, where a single loudspeaker 15 defines a single outside area 16-1 in the approach of the premises 4 (near the main door 6). For instance, the location-specific usage information represented by the sound signal emitted in the area 16-1 may indicate that vaping is allowed in this area 16-1 or that vaping is forbidden inside the whole premises 4.

Also, for instance, in an embodiment the first circuitry 14 may be further configured to transmit a notification to an electronic equipment 2 associated with a user 17-k of an electronic device 3, 21 that is in the vicinity of a premises 4 comprising at least one area 16-j where usage of an electronic device 3, 21 is permitted or restricted or else forbidden. In this case the notification indicates when a sound signal based usage policy, defining usage of the electronic device 3, 21 in the premises 4, is applicable.

The transmission of the notification may be carried out by a communication interface of the system 1 to the communication interface of the electronic equipment 2 by means of a wireless communication. Such a wireless communication may be a Bluetooth communication, for instance. But this is a non-limiting example, and other types of short-range wireless communications are possible, and notably NFC, RFID, ZigBee, and WiFi Direct. But in a variant the notification could be transmitted by dedicated sound signals emitted by a loudspeaker 15 in the associated area 16-j.

As an example of embodiment, the sound signal based usage policy may comprise:

a time interval of day during which usage of the electronic device 3, 21 is permitted in the premises 4, and/or at least one area 16-j of the premises 4 where usage of the electronic device 3, 21 is permitted or restricted or forbidden, and/or information indicating whether usage of a specific type of the electronic device 3, 21 is permitted in the premises 4, and/or a name of a restaurant or bar or shop where usage of the electronic device 3, 21 is permitted or restricted or forbidden.

In an embodiment, the invention may also be considered as a method comprising at least two operations 100-110 as illustrated in the non-limitative example of algorithm of FIG. 3. Such a method may be implemented at least partly by the system 1 described above.

In a first operation 100 of this method, one controls at least one sound signal output device 14 to emit, in at least one chosen area 16-j of a premises 4, at least one sound signal representing location-specific usage information of at least one electronic device 3, 21.

In a second operation 110 of the method, one induces control of usage of an electronic device 3, 21 (located in this chosen area 16-*j*) based on this location-specific usage information.

As mentioned above the emitted sound signals may induce directly or indirectly control of usage of an electronic device 3, 21.

An indirect usage control is performed by means of an electronic equipment 2 intended for being used by the user 17-*k* of an electronic device 21 (second type).

Such an electronic equipment 2, which may be a smartphone, for instance, comprises a second circuitry 18 comprising at least a processor and a memory arranged for performing operations. For instance, the (each) processor may be a digital signal processor (or DSP), or an application specific integrated circuit (ASIC), or else a field programmable gate array (FPGA). More generally, the processor may comprise integrated (or printed) circuits, or several integrated (or printed) circuits connected therebetween through wired or wireless connections. Also, for instance, the memory may be a random access memory (or RAM). But it may be any type of device arranged for storing program instructions for the associated processor.

Generally speaking, the functions of the second circuitry 18 may be carried out through the operation of program logic, through dedicated logic, through the interaction of program control and dedicated logic, or even partially manually (by a user 17-*k*). These functions may be provided through the use of dedicated hardware as well as hardware capable of executing software in association with appropriate software.

The second circuitry 18 may also comprise, in addition with its processor(s) and memory(ies), an input interface, a mass memory (notably for storing intermediate data produced during its calculus and processing), and an output interface for delivering messages and instructions.

Figure 4:
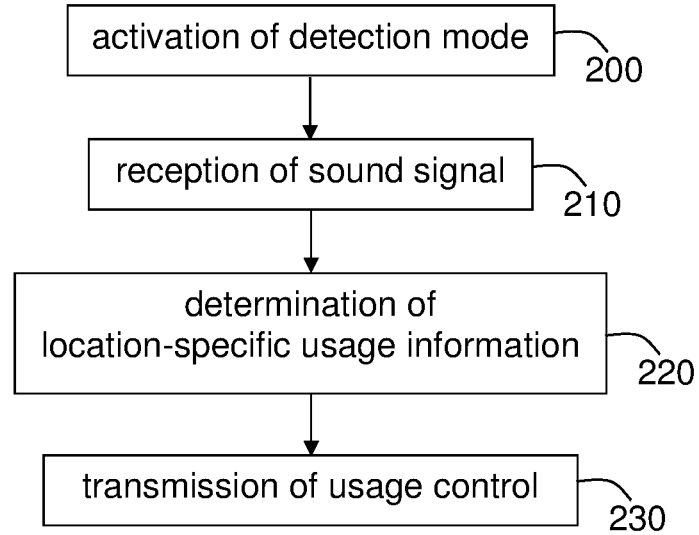

As illustrated in FIG. 4 the second circuitry 18 is configured to carry out at least three operations 210-230.

A first operation 210 consists in receiving a sound signal (representing location-specific usage information of an electronic device 3, 21), and emitted in an area 16-*j* of a premises 4 by a sound signal output device 14 of the system 1 equipping this premises 4. Of course, this first operation 210 can be only performed if the user 17-*k* is located in the area 16-*j* with his electronic equipment 2, and if the latter (2) comprises a microphone 19 adapted to receive the considered sound signals (notably when they are totally or partially inaudible).

A second operation 220 consists in determining a location-specific usage information from the received sound signal.

A third operation 230 consists in transmitting a control command, based on the determined location-specific usage information, to the electronic device 21 (that is associated to the electronic equipment 2 of the user 17-*k*) in order to induce control of usage of this electronic device 21.

So, in this embodiment this is the electronic equipment 2 who receives the sound signal, determines the location-specific usage information, and transmits a control command adapted to this location-specific usage information to the electronic device 21, in order to control its usage.

For instance, the transmission of the control commands may be carried out by the communication interface of the electronic equipment 2 by means of a wireless communication established with the associated electronic device 21 if they have been previously paired together. Such a wireless communication may be a Bluetooth communication, for instance. But this is a non-limiting example, and other types of short-range wireless communications are possible, and notably NFC, RFID, ZigBee, and WiFi Direct.

It is important to note that the local usage of the electronic device 21 may be enforced automatically by the transmitted control command or may be enforced by the user after it has been informed by his electronic device 21 in response to the transmitted control command. In the second alternative the transmitted control command may, for instance, trigger a display of a corresponding text information by a screen of the electronic device 21, or trigger a corresponding activation or deactivation of a light of the electronic device 21, or else trigger a play of a corresponding audio message by a loudspeaker of the electronic device 21. This option allows to provide the user with the usage status of his electronic device 21 in the current area 16-*j* or in the premises zone in which he is about to penetrate. For instance, a displayed text information may be "vaping allowed" or "vaping forbidden" or else "only e-vaping allowed". Also, for instance, a green light may indicate that vaping is authorized, while a red light may indicate that vaping is forbidden.

Also, for instance, in an embodiment well adapted to the first alternative (local usage enforced automatically by the transmitted control command) and illustrated in FIGS. 1 and 2, the electronic equipment 2 may further comprise a memory 20 configured to store a table of correspondence between a plurality of location-specific usage information and a plurality of text information. In this case, the second circuitry 18 is configured to determine, during the second operation 220 and into the memory 20, a text information that corresponds to the determined location-specific usage information, and then to control transmission by its electronic equipment 2, during the third operation 230, of this determined text information to the associated electronic device 21. This transmission is intended for triggering a display of the transmitted text information by a screen of the electronic device 21, or for triggering an activation or deactivation of a light of the electronic device 21 depending on the transmitted text information, or else for triggering a play of an audio message depending on the transmitted text information by a loudspeaker of the electronic device 21.

This option allows the user to be informed of the automatically enforced usage of his electronic device 21, locally allowed in the area 16-*j* of the premises 4 in which he is temporarily located or in which he is about to enter.

As mentioned above, in an embodiment the usage control induced by the transmission of a control command may:

allow activation of the electronic device 3 (here to allow a vaping session), disable activation of the electronic device 3 (here to forbid any vaping session), control the strength of a material used in the electronic device 3, control the time duration of usage of the electronic device 3, output an optical signal indicating whether usage of the electronic device 3 is restricted or permitted or else forbidden, and output an audio alert indicating whether usage of the electronic device 3 is restricted or permitted or else forbidden.

Also, for instance, in an embodiment the second circuitry 18 may be configured to carry out a preliminary operation 200 consisting in activating a detection mode of its electronic equipment 2 when a chosen command is received, and in continuously monitoring for the reception of a received sound signal when this detection mode has been activated.

This chosen command may be provided by the user to his electronic equipment 2 by means of an action on a user interface, or by a message transmitted, for instance by a beacon located in the area 16-*j* in which the user is now located, and received by his electronic equipment 2. Such a beacon may be part of the system 1, for instance.

Also, for instance, in an embodiment the second circuitry 18 may be configured to transmit another control command to the electronic device 21 (that is associated to its electronic equipment 2) when a chosen first time interval without receiving any new sound signal has elapsed. This other control command is intended for authorizing this electronic device 21 to be re-activated if its activation has been previously disabled. For instance, this first time interval may be comprised between 5 minutes and 10 minutes.

A direct usage control induced by the emitted sound signals is performed by an electronic device 3 intended for being used by a user 17-*k*.

Such an electronic device 3 comprises a third circuitry 22 comprising at least a processor and a memory arranged for performing operations. For instance, the (each) processor may be a digital signal processor (or DSP), or an application specific integrated circuit (ASIC), or else a field programmable gate array (FPGA). More generally, the processor may comprise integrated (or printed) circuits, or several integrated (or printed) circuits connected therebetween through wired or wireless connections. Also, for instance, the memory may be a random access memory (or RAM). But it may be any type of device arranged for storing program instructions for the associated processor.

Generally speaking, the functions of the third circuitry 22 may be carried out through the operation of program logic, through dedicated logic, through the interaction of program control and dedicated logic, or even partially manually (by a user 17-*k*). These functions may be provided through the use of dedicated hardware as well as hardware capable of executing software in association with appropriate software.

The third circuitry 22 may also comprise, in addition with its processor(s) and memory(ies), an input interface, a mass memory (notably for storing intermediate data produced during its calculus and processing), and an output interface for delivering messages and instructions.

Figure 5:
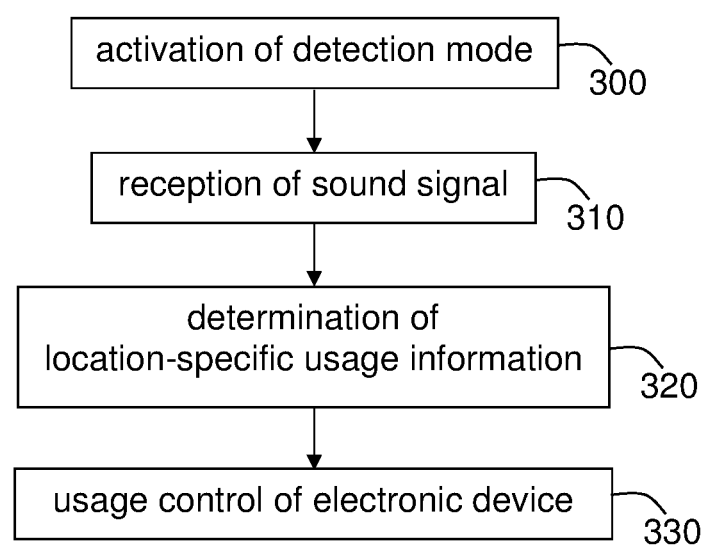

As illustrated in FIG. 5 the third circuitry 22 is configured to carry out at least three operations 310-330.

A first operation 310 consists in receiving a sound signal (representing location-specific usage information of an electronic device 3, 21), and emitted in an area 16-*j* of a premises 4 by a sound signal output device 14 of the system 1 equipping this premises 4. Of course, this first operation 310 can be only performed if the user 17-*k* is located in the area 16-*j* with his electronic device 3, and if the latter (3) comprises a microphone 23 adapted to receive the considered sound signals (notably when they are totally or partially inaudible).

A second operation 320 consists in determining a location-specific usage information from the received sound signal.

A third operation 330 consists in controlling a usage of the electronic device 3 based on the determined location-specific usage information.

So, in this embodiment it is the electronic device 3 who receives the sound signal, determines the location-specific usage information, and controls its own usage based on this location-specific usage information.

As mentioned above, in an embodiment the usage control may:

allow activation of the electronic device 3 (here to allow a vaping session), disable activation of the electronic device 3 (here to forbid any vaping session), control the strength of a material used in the electronic device 3, control the time duration of usage of the electronic device 3, output an optical signal indicating whether usage of the electronic device 3 is restricted or permitted or else forbidden, and output an audio alert indicating whether usage of the electronic device 3 is restricted or permitted or else forbidden.

Also, for instance, in an embodiment the third circuitry 23 may be configured to carry out a preliminary operation 300 consisting in activating a detection mode of its electronic device 3 when a chosen command is received, then in continuously monitoring for the reception of a received sound signal when this detection mode has been activated, and in controlling usage of the electronic device 3 based on each received sound signal.

This chosen command may be provided by the user to his electronic device 3 by means of an action on a user interface, or by a message transmitted, for instance by a beacon located in the area 16-*j* in which the user is now located, and received by his electronic device 3. Such a beacon may be part of the system 1, for instance.

Also, for instance, in an embodiment the third circuitry 23 may be configured to set its electronic device 3 to a disabled mode based on non-receipt of the sound signal when a chosen second time interval without receiving any new sound signal has elapsed after having been previously set in an enabled mode (here authorizing a vaping session). This option prevents a use of the electronic device 3 in premises zones where the sound signals cannot be received and the usage of electronic devices 3 is forbidden, as this is the case in the first example illustrated in FIG. 1.

For instance, the second time interval may be comprised between 30 s and 2 min.

Also, for instance, in an embodiment the third circuitry 23 may be configured to authorize its electronic device 3 to be re-activated (or set in an enabled mode) when the chosen first time interval without receiving any new sound signal has elapsed after having been previously set in a disabled mode. This option allows notably a user to re-use his electronic device 3 once he left a premises 4 where the usage of electronic devices 3 was forbidden, as this is the case in the first example illustrated in FIG. 1, or when he went out a premises room where the usage of electronic devices 3 was forbidden to enter in a premises zone where the usage of electronic devices 3 is authorized but not indicated by sound signals, as this is the case in a part of the hall 7 of the second example illustrated in FIG. 2.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the inven-

What is claimed is:

1. A system, comprising:
circuitry configured to control at least one sound signal output device to emit, in at least one chosen area of a premises, at least one sound signal representing location-specific usage information of at least one electronic device, wherein
said at least one sound signal induces control of usage of said at least one electronic device based on said location-specific usage information;
said location-specific usage information comprises at least one of restriction information indicating whether said usage of said at least one electronic device is restricted or forbidden, permission information indicating whether said usage of said at least one electronic device is permitted, electronic device specific information that indicates whether said usage of a specific type of said at least one electronic device is permitted, or location information that indicates at least one area of said premises where said usage of said at least one electronic device is permitted or restricted, and
said location-specific usage information further comprises first timing information that indicates a time interval of day during which said usage of said at least one electronic device is permitted and second timing information that indicates another time interval of said day during which said usage of said at least one electronic device is restricted or forbidden.

2. The system according to claim 1, wherein
said circuitry is further configured to control at least one parameter of said emitted at least one sound signal to change at least one a surface or a location of said at least one chosen area, and
each parameter is chosen from one of an intensity of said emitted at least one sound signal, a directivity of said emitted at least one sound signal, a frequency range of said emitted at least one sound signal, or a sound signal source localization of said emitted at least one sound signal.

3. The system according to claim 1, wherein said emitted at least one sound signal is one of an inaudible standalone sound signal representing said location-specific usage information, a first audible sound signal representing said location-specific usage information, or a mixed sound signal that includes a mix of an inaudible sound signal representing said location-specific usage information and a second audible sound signal.

4. The system according to claim 3, wherein said second audible sound signal is one of a natural sound signal, a music, or an audio advertisement.

5. The system according to claim 1, wherein said emitted at least one sound signal is a combination of said location-specific usage information with a primary sound signal.

6. The system according to claim 1, wherein
said at least one sound signal output device comprises a group of loudspeakers distributed across said premises to establish a plurality of chosen areas at different locations within said premises, and
at least one of said plurality of chosen areas has a controllable virtual boundary for application of a corresponding location-specific usage information.

7. The system according to claim 6, wherein said plurality of chosen areas includes:

at least one first chosen area of said premises associated with a first type of location-specific usage information; and
at least one second chosen area of said premises associated with a second type of location-specific usage information.

8. The system according to claim 1, wherein
said circuitry is further configured to transmit a notification to an electronic equipment associated with a user,
said electronic equipment is in a vicinity of said premises,
said premises comprises said at least one area where said usage of said at least one electronic device is one of permitted, restricted, or forbidden, and
said notification indicates a time period during which a sound signal based usage policy, defining said usage of said at least one electronic device in said premises, is applicable.

9. The system according to claim 8, wherein said sound signal based usage policy is chosen from one of said time interval of said day during which said usage of said at least one electronic device is permitted in said premises, said at least one area of said premises where said usage of said at least one electronic device is one of permitted, restricted, or forbidden, said electronic device specific information indicating whether said usage of said specific type of said at least one electronic device is permitted in said premises, or a name of one of a restaurant, a bar, or a shop where said usage of said at least one electronic device is one of permitted, restricted, or forbidden.

10. A method, comprising:
controlling at least one sound signal output device to emit, in at least one chosen area of a premises, at least one sound signal representing location-specific usage information of at least one electronic device, wherein
said at least one sound signal induces control of usage of said at least one electronic device based on said location-specific usage information,
said location-specific usage information comprises at least one of restriction information indicating whether said usage of said at least one electronic device is restricted or forbidden, permission information indicating whether said usage of said at least one electronic device is permitted, electronic device specific information that indicates whether said usage of a specific type of said at least one electronic device is permitted, or location information that indicates at least one area of said premises where said usage of said at least one electronic device is permitted or restricted, and
said location-specific usage information further comprises first timing information that indicates a time interval of day during which said usage of said at least one electronic device is permitted and second timing information that indicates another time interval of said day during which said usage of said at least one electronic device is restricted or forbidden.

11. An electronic equipment, comprising:
a memory configured to store a table of correspondence between a plurality of location-specific usage information of an electronic device and a plurality of text information; and
circuitry configured to:
receive a sound signal representing location-specific usage information of said electronic device, wherein said received sound signal is emitted in an area of a premises by a sound signal output device;

determine said location-specific usage information from said received sound signal;

transmit a control command, based on said determined location-specific usage information, to said electronic device to induce a control of usage of said electronic device;

determine text information, corresponding to said determined location-specific usage information, among said plurality of text information in said memory; and control transmission of said determined text information to said electronic device for one of triggering a display of said text information by a screen of said electronic device, triggering an activation or deactivation of a light of said electronic device depending on said text information, or triggering a play of an audio message depending on said text information by a loudspeaker of said electronic device.

12. The electronic equipment according to claim 11, wherein said circuitry is further configured to:

activate a detection mode of said electronic equipment in a case where a chosen command is received; and continuously monitor for said reception of said sound signal in a case where said detection mode has been activated.

13. An electronic device, comprising:

circuitry configured to:

receive a sound signal emitted in an area of a premises by a sound signal output device;

determine location-specific usage information of said electronic device from said received sound signal;

control a usage of said electronic device based on said determined location-specific usage information; and set said electronic device to a disabled mode based on non-receipt of said sound signal in a case where a chosen time interval without receiving a new sound signal has elapsed after having been previously set in an enabled mode.

14. The electronic device according to claim 13, wherein said control of said usage comprises one of allowing activation of said electronic device, disabling said activation of said electronic device, controlling a strength of a material used in said electronic device, controlling a time duration of said usage of said electronic device, outputting an optical signal indicating whether said usage of said electronic device is one of restricted, permitted, or forbidden, or outputting an audio alert indicating whether said usage of said electronic device is one of restricted, permitted, or forbidden.

15. The electronic device according to claim 13, wherein said circuitry is further configured to:

activate a detection mode of said electronic device in a case where a chosen command is received;

continuously monitor for said reception of said sound signal in a case where said detection mode has been activated; and control usage of said electronic device based on said received sound signal.

16. The electronic device according to claim 13, wherein said electronic device is one of an aerosol generation device, a tobacco delivery device, a nicotine delivery device, an electronic cigarette, or a vaping device.

17. A system, comprising:

at least one sound signal output device; and circuitry configured to control said at least one sound signal output device to emit, in at least one chosen area of a premises, at least one sound signal representing location-specific usage information of at least one electronic device, wherein said at least one sound signal induces control of usage of said at least one electronic device based on said location-specific usage information, said at least one sound signal output device comprises a group of loudspeakers distributed across said premises to establish a plurality of chosen areas at different locations within said premises, and at least one of said plurality of chosen areas has a controllable virtual boundary for application of a corresponding location-specific usage information.

* * * * *